Nov. 8, 1960  L. E. OBERHOLTZ ET AL  2,959,175
MOUNTING FOR A THRESHING CYLINDER CONCAVE
Filed March 26, 1958  2 Sheets-Sheet 1

Inventors
Lester E. Oberholtz
Edgar S. Miller
By Donald C. McGaughey
Attorney

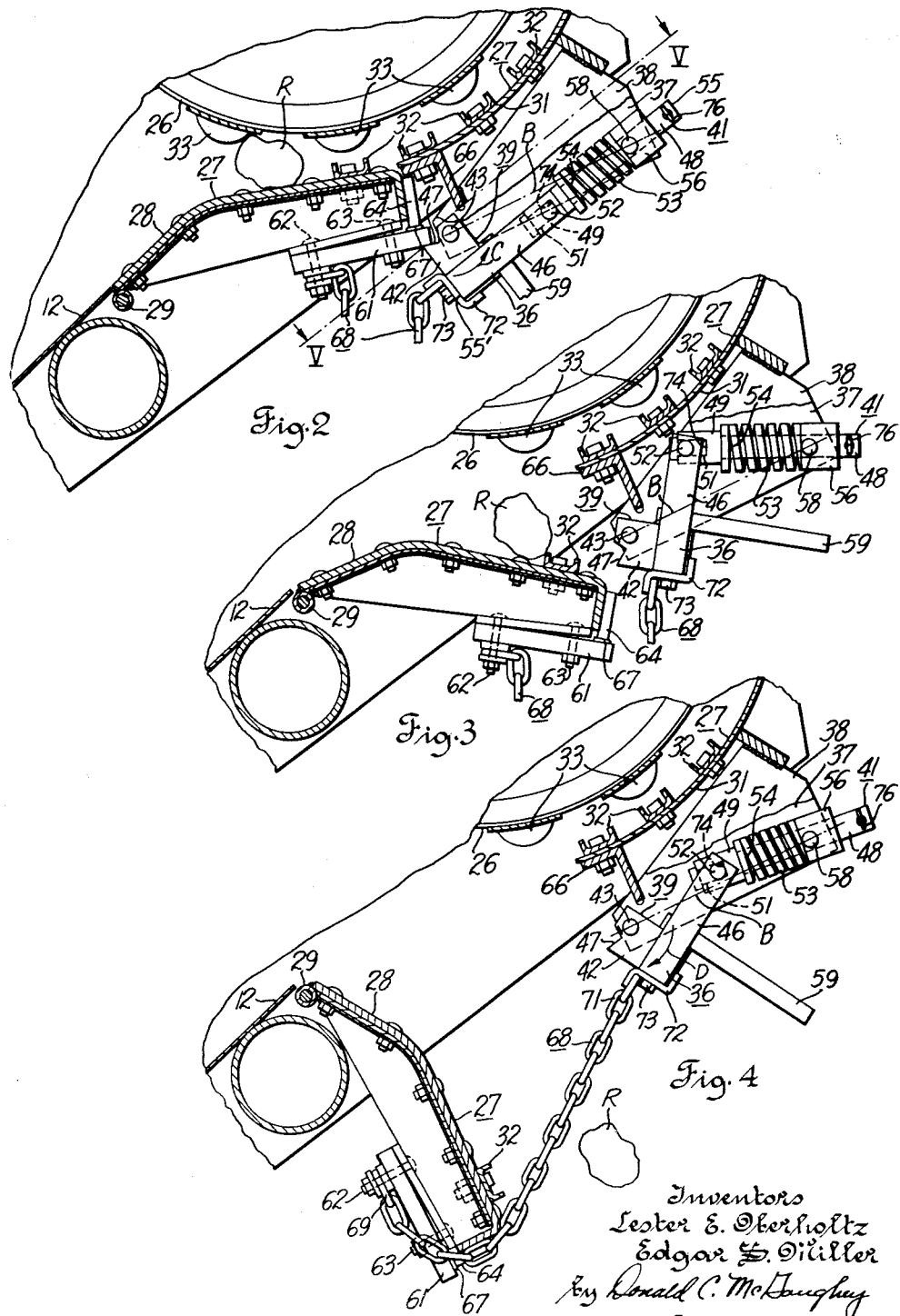

United States Patent Office 2,959,175
Patented Nov. 8, 1960

2,959,175

MOUNTING FOR A THRESHING CYLINDER CONCAVE

Lester E. Oberholtz and Edgar S. Miller, Independence, Mo., assignors to Allis-Chalmers Manufacturing Company, Milwaukee, Wis.

Filed Mar. 26, 1958, Ser. No. 724,136

4 Claims. (Cl. 130—27)

This invention relates to a threshing cylinder concave mounting and more particularly to a mounting of the type which will permit a concave to swing open under an overload condition in a manner which will prevent damage to the concave and its associated mounting structure.

In concave mountings of the overload release type the concave is usually mounted for swinging movement from a closed position in threshing relation to a threshing cylinder to an open nonthreshing position. A latch mechanism is provided which will maintain the concave in its normally closed position but which will release when a predetermined load pressure is experienced by the concave. In most instances this overload pressure is caused by a foreign object such as stone or the like which enters between the cylinder and concave. This overload pressure imparts a high initial velocity to the concave when it is forced open and as these concaves frequently weigh in excess of 65 pounds it will be appreciated that high inertia forces are involved.

In most instances the inertia force of the downward swinging concave is sufficiently high to cause severe damage to the pivotal mounting of the concave if it is abruptly stopped by encounter with a part of the frame structure. It has been suggested to provide a bumper or buffer against which the concave will hit as it swings open so that this inertia force will be absorbed. These prior art practices have not been entirely satisfactory particularly in that heretofore known buffer mechanisms have not absorbed a sufficient amount of the inertia force to prevent damage to the concave mounting. In addition, suitable mounting structure for conventional buffer mechanism is frequently unavailable or, as may some time occur, the space limitations are so restricted by the frame structure that installation of bumper or buffer devices as heretofore known is not possible or practical.

It is desirable then that a concave mounting include provision for absorbing this high inertia force generated by the concave as it swings open. Further the necessary concave mounting mechanism should require a minimum of space for installation, preferably no more than is required to permit the concave to swing open. As mentioned above, frequently there is no convenient structure on which a conventional bumper or shock absorbing device may be mounted and the concave mounting should not require such structure for its installation and effective operation.

Generally it is an object of the invention to provide a concave mounting which will satisfy the hereinbefore outlined requirements in a fully satisfactory manner.

Another object of the invention is to provide a concave mounting of the overload release type which will absorb the inertia force of the concave as it swings to an open position to prevent damage to the hinged mounting thereof.

Another object of the invention is to provide a concave mounting of the hereinbefore outlined type which requires a minimum of space for installation and effective operation.

A further object of the invention is to provide a concave mounting which will absorb the inertia force in a manner which does not require the concave to contact or coact with any part of the supporting structure, other than the releasable latch mechanism which is used to maintain the concave in its closed position.

The foregoing and other objects and advantages are attained by the present invention, various novel features of which will become apparent from the description herein and accompanying drawings disclosing an embodiment of the invention, and as will be more particularly pointed out in the claims.

Fig. 2 is an enlarged fragmentary view of the forward portion of the combine indicated generally by arrow A in Fig. 1 showing the threshing cylinder, concave mounting and associated latch mechanism therefor;

Fig. 3 is a view identical to that of Fig. 2 and showing the concave and latch structure in a partially open position;

Fig. 4 is a view identical to that of Fig. 2 and showing the concave and latch structure in fully open position.

Figure 1:
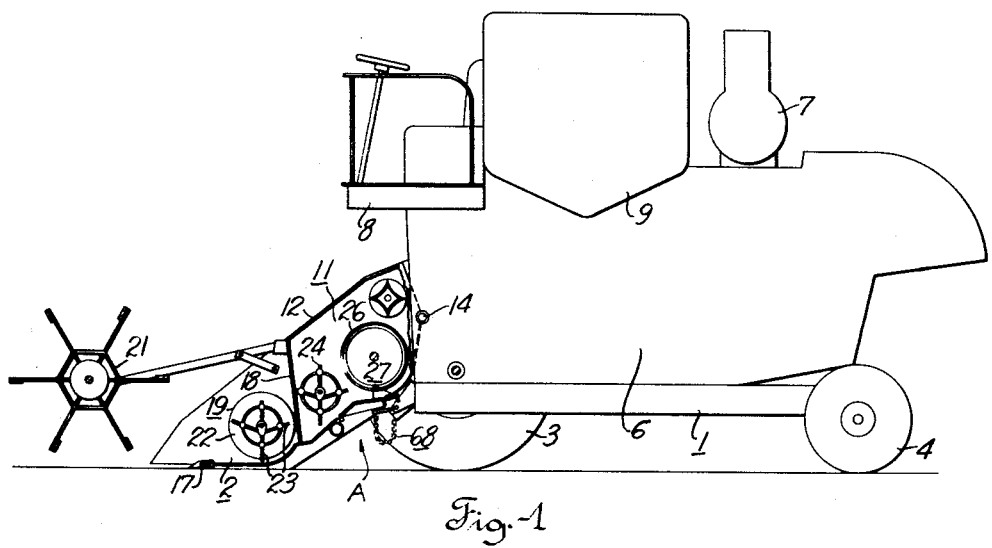
Fig. 1 is a side elevation partially in section of a combine with the near front wheel removed for purposes of disclosure.

The combine shown in Fig. 1 includes a mobile longitudinal body structure generally indicated by the reference character 1 and a laterally extending header structure generally indicated by the reference character 2. The body structure 1 is of generally conventional construction in that it comprises a pair of laterally spaced front driving wheels 3, a pair of laterally spaced steerable rear wheels 4, a separator mechanism enclosed within a housing 6 and an engine 7 for supplying power to the driving wheels 3 and to the other power driven parts of the combine. The body structure 1 further includes an operator's station 8, a grain bin 9 and a threshing mechanism 11 enclosed within a housing or throat portion 12 at the forward end of the body structure 1. The thresher housing 12 is pivoted at 14 for up and down adjustment to different elevated positions above the ground affording selection of desired cutting height of the header structure 2. It will be understood that up and down adjustment of the thresher housing 12 about the pivot 14 is accomplished in a conventional manner by hydraulic rams (not shown) and a suitable control mechanism therefor (not shown) mounted at the operator's station 8.

The header structure 2 includes a cutting mechanism 17 of the reciprocating sickle bar type which extends across the full width of the header and an L-shaped header housing or trough generally indicated by the reference character 18. The header structure further includes a conventional transverse auger 19 rotatably mounted within the L-shaped trough 18 and a conventional reel mechanism 21. The entire header structure 2 including the cutting mechanism 17, auger 19 and reel 21 is rigidly secured to the forward part of the thresher housing or throat 12 in conventional manner.

As shown in Fig. 1, and in accordance with generally accepted practice, crops cut by the reciprocating cutting mechanism 17 are conveyed to the center of the header trough 18 by means of flighting 22 on the auger 19. At the center or midportion of the auger 19, the cut material is engaged by a conventional retractable finger mechanism 23 which aids in passing the crop rearwardly from the header 2 into the narrow throat portion 12. In the narrow throat portion 12 the cut crop is again engaged by a second retractable finger feeding mechanism 24 which aids in delivery of the crop to the threshing cylinder and concave, 26 and 27, respectively. It will be understood that the harvested material is fed between the threshing cylinder 26 and the associated concave 27 for threshing in a conventional manner.

It will be appreciated that during the cutting operation the cutting mechanism 17 and header 2 frequently encounter and pick up foreign objects such as stones and the like illustrated by rock R, Fig. 2. The auger flighting 22 and the retractable finger feed mechanisms 23 and 24 will sometimes carry these foreign objects up to the threshing cylinder 26 where they attempt to pass between the threshing cylinder 26 and the concave 27. In the absence of any special provision these foreign objects are very likely to cause severe damage to both the concave 27 and the threshing cylinder 26. The present invention is concerned with a novel method of mounting the threshing cylinder concave 27 in a manner which will permit it to swing open under an overload condition which may be caused by foreign objects such as rock R in Fig. 2.

As best shown in Fig. 2 the threshing cylinder coacts with, or is in threshing relation with, concave 27 which is composed of two basic parts. The first section or forward portion 28 of the concave 27 is pivotally mounted on a support in the form of throat structure 12 of the combine by means of a hinge 29. The second section or rearward portion 31 of the concave 27 is rigidly mounted on throat 12 and does not move relative to the threshing cylinder 26. The threshing action is accomplished by a series of concave bars 32 which coact with threshing cylinder bars 33 to thresh the grain out of the crop fed therebetween.

Figure 5:
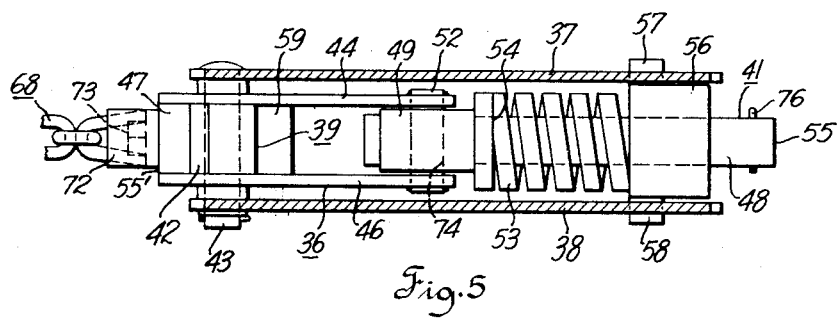
Fig. 5 is an enlarged fragmentary section taken along lines V—V of Fig. 2.

Referring to Fig. 2, it will be noted that the pivotally mounted concave section 28 is normally held in the closed position, that is, in threshing relation to cylinder 26 by concave control means including a latch mechanism generally designated by the reference character 36. Suitable supporting structure for the latch mechanism 36 is provided by members 37 and 38, Fig. 5, rigidly secured to the throat structure 12 to depend therefrom in spaced parallel relation to each other. The latch mechanism 36 as shown in Figs. 2 and 5 is of the toggle linkage type and is mounted between members 37 and 38. The latch 36 includes a catch subassembly 39 and a toggle subassembly 41. The catch subassembly includes a catch block 42 which is pivotally mounted between the members 37 and 38 by first pivot means in the form of pin 43. A pair of bars 44 and 46 are rigidly secured to opposite sides of the catch block 42 in radially spaced relation to the pivot means or pin 43. The catch block 42 further includes a catch member 47 operable to retain the concave section 28 in its closed position as will be more fully explained below. It will be noted that the catch subassembly 39 is basically in the form of a bell crank with the catch member 47 forming one of the arms of the bell crank and the other arm of the bell crank being formed by the pair of bars 44 and 46 and the lower part of catch block 42.

The toggle subassembly 41 which also forms part of the concave control means includes an elongated toggle link 48 having an enlarged end 49 which is provided with an axially elongated slot 51. The width of the enlarged end 49 is such that it will be loosely received between the bars 44 and 46 and it is secured therebetween by second pivot means in the form of pivot pin 52 which passes through suitable apertures in bars 44 and 46 and through the elongated slot 51. The other or free end of toggle link 48 is slidably received in an aperture presented by yoke 56. The yoke 56 is in turn pivotally mounted between the frame members 37 and 38 by means of a pair of trunnions 57 and 58 formed integrally therewith. It will be understood that the yoke constitutes a third pivot means permitting the toggle link 48 to both pivot relative to the throat supporting structure 12 and to slide longitudinally thereof. That is, the latch mechanism or toggle linkage 36 has one cylindrical end portion 55 slidably mounted in the yoke 56 and pivotable about the axis established by the trunnions 57 and 58 causing the end portion 55 to be effectively, pivotably and slidably mounted on the supporting throat housing 12. The other end of the toggle linkage 55' is mounted on a portion of catch block 42 in radially spaced relation to pivot pin 43. A compression spring or resilient means 53 is mounted in surrounding relation to an intermediate portion of the toggle link 48 and has one end abutting the shoulder 54 provided by enlarged portion 49. The other end of spring 53 is in abutting relation to yoke 56. The latch mechanism 36 further includes a latching handle 59 which is rigidly secured to the catch block 42 as by welding. The handle 59 is necessary in relatching the concave section 28 after its release as will be more fully explained hereinbelow.

The concave section 28 is provided with a latch bar 61 rigidly secured by means of bolts 62 and 63. The latch bar 61 cooperates with the catch 47 presented by catch block 42 and is operable to maintain the concave in its closed position. The concave section 28 includes a stop bar 64 which coacts with angle iron 66 to provide an upper limit stop for the concave section 28. For proper locking action of the latch mechanism 36 the bars 44 and 46, Fig. 2, must be in straight line relation with the toggle link 48. That is, the force of spring 53 is applied to the catch block 42 through the toggle link 48 and bars 44 and 46 and is most effective when these elements are in a straight line relation to each other. This straight line relation is achieved by loosening bolts 62 and 63 securing the latch bar 61 and adding or removing shims 67 between the stop bar 64 and the latch bar 61. Flexible load transmitting means in the form of chain 68 operatively interconnects the concave section 28 with spring 53 through the latch mechanism 36. Referring particularly to Fig. 4, it will be seen that the flexible load transmitting means 68 has one end 69 thereof anchored to latch bar bolt 62, that is, to a portion of concave 28 located in radially spaced relation to its pivot mounting 29. The chain 68 is operatively connected at its other end 71 to the catch block 42 through the provision of clip 72 and cap screw 73.

Under normal operating conditions the latch mechanism 36 is in the locked position shown in Fig. 2, the spring 53 being in a compressed or loaded condition between the longitudinally fixed support provided by the yoke or pivot 56 and the enlarged end or shoulder 54 of toggle link 48. This spring pressure urges the inside end 74 of slot 51 into engagement with the second pivot means or pin 52. The pressure on pin 52 is transmitted to bars 44 and 46 and applies a pivoting force on the catch block 42 tending to pivot it about pin 43. This pivotal action results in an applied force on the latch bar 61 through catch member 47 sufficient to maintain concave section 28 in a closed position. From the foregoing it will be understood that spring 53 is operatively interposed between a fixed support as provided by yoke 56 and the catch member 47 to yieldingly maintain the latter in latching engagement with concave 28.

Entry of foreign material such as rock R, Fig. 2, between the threshing cylinder 26 and the concave section 28 will create a pressure and when this pressure is sufficient to overcome the applied force of spring 53 the catch block 42 will begin to pivot counterclockwise in the direction of arrow C shown in Fig. 2. The counterclockwise movement will continue until the latch bar 61 will clear the end of catch member 47 to thus permit the concave section 28 to drop to an open nonthreshing position. The relationship between the one lever arm formed by the catch member 47 and other lever arm formed by the bars 44 and 46 is such that prior to clearance of latch bar 61 from catch 47, the pivot pin 52, interconnecting the bars 44 and 46 and the toggle link 48, will pass overcenter of line B, shown in Fig. 2, which is drawn between the first and third pivot means 43 and 57, 58. That is, the second pivot means 52 will move from a spring compressing position on one side of center line B to a spring unloaded position on the other side of center line B. As the second pivot means 52 passes over the center line, the action of spring 53 will cease to resist pivotal movement of catch block 42 and will aid in the counterclockwise unlatching movement of catch block 42. This action provides instantaneous parting of catch 47 from latch bar 61 which minimizes wear and damage to these parts. Upon release of the catch the catch mechanism 36 will assume a jackknife position, such as shown in Fig. 3. The slidable mounting of toggle link 48 in yoke 56 affords lost motion to provide the full extent of jackknife movement shown in Fig. 3.

The concave section 28 in swinging open will permit rock R to drop outward upon the ground. As the concave 28 continues to swing open the slack in chain 68 is taken up. Upon full take-up of the slack in the chain 68 the inertia force of the concave section is transferred through the chain to the catch block 42. It will be noted that the attachment of chain 68 to catch block 42 is at a point thereon which is radially spaced from the pivot 43. Thus the application of force thereto will result in a rotation of the catch block 42 in the direction of arrow D in Fig. 4. This clockwise rotation results in a return or downward movement of the catch mechanism 36 toward the original straight line relationship shown in Fig. 2 but only to the extent illustrated in Fig. 4. This return movement forces pin 52 into engagement with surface 74 of the enlarged portion 49 thereby forcing the enlarged portion 49 toward the yoke 56. This movement of portion 49 results in a recompression of spring 53 and it will be appreciated that the inertia force of the swinging concave 28 will be used in recompressing the spring 53. Thus the spring 53 resiliently limits downward swinging of the concave 28. After all of the inertia force of concave 28 has been expended in recompressing spring 53 it in turn will expand and again jackknife the linkage 36 but to a much lesser extent than that shown in Fig. 3. Thus as a practical matter there is a limited amount of rebound action which will take place until all of the inertia force has been dissipated.

Under normal conditions the inertia force in the swinging concave section 28 is not great enough to recompress spring 53 sufficiently to force the center of pivot pin 52 to pass back overcenter of line B. Under certain operating conditions however the initial pressure applied to the concave section 28 may be so great that an unusually high initial velocity is imparted to the concave 28 and it is possible that the inertia force might be great enough to compress spring 53 sufficiently to force pivot pin 52 to pass back overcenter of line B. Should this occur, the catch block simply pivots a greater distance in the direction of arrow D, Fig. 4, and it is possible that the toggle link 48 will tend to be pulled out of the yoke 56. This occurrence is prevented by the provision of cotter pin 76 which is inserted in a suitable aperture in the end of link 48.

It will be appreciated from the foregoing description that applicant has provided a concave mounting which utilizes the latching spring 53 for purposes of shock load take-up thereby avoiding any damage to the pivotal mounting 29 of the concave section 28. As the shock load take-up is achieved through the provision of the flexible load transmitting chain 68 it is not necessary that any buffer or bumper element be provided for the concave 28 to hit against. In addition, the chain 68 does not require any additional clearance or space for installation and operation other than that which will be required for the concave section to swing to its open position.

After the concave section 28 has opened under overload conditions it is necessary that it be relatched by the operator of the machine. To relatch, the hand lever 59 is first moved counterclockwise to the position shown in Fig. 3. This position provides clearance so that the concave section 28 may be swung upwardly without the latch bar 61 contacting the catch member 47. When the door is positioned in a closed position, as shown in Fig. 2, the hand lever 59 is pulled downward thereby compressing spring 53 and forcing the catch 47 into engagement with the latch bar 61.

It is not intended to limit the invention to the exact construction herein shown and described for purposes of illustration, as various modifications within the scope of the appended claims may occur to persons skilled in the art.

What is claimed is:

1. A concave mounting for a threshing mechanism of the type having a rotatably mounted threshing cylinder comprising: a support member; a concave pivotally mounted on said support member for swinging movement from a closed position in threshing relation to said cylinder to an open nonthreshing position; concave control means for releasably locking said concave in said closed position including, a catch member mounted on said support member for movement into and out of latching engagement with said concave; a toggle linkage operatively connected between said support member and said catch member; resilient means operatively interposed between one of said members and said toggle linkage to yieldingly maintain said catch member in latching engagement with said concave; and flexible load transmitting means anchored at one of its ends on said concave and operatively connected at the other of its ends to said resilient means for limiting downward swinging movement of said concave.

2. A concave mounting for a threshing mechanism of the type having a rotatably mounted threshing cylinder comprising: a support; a concave pivotally mounted on said support for downward swinging movement from a closed position in threshing relation to said cylinder to an open nonthreshing position; concave control means for releasably locking said concave in said closed position including, a catch member mounted on said support for movement into and out of latching engagement with said concave, a toggle linkage operatively mounted between said support and said catch member, and spring means operatively connected at one end thereof to said support and at the other end thereof to said toggle linkage for biasing the latter and associated catch into latching engagement with said concave; and flexible load transmitting means anchored at one of its ends to said concave and operatively connected at its other end to said other end of said spring means for limiting downward swinging movement of said concave.

3. A concave mounting for a threshing mechanism of the type having a rotatably mounted threshing cylinder comprising: a support; a concave pivotally mounted on said support for downward swinging movement from a closed position in threshing relation to said cylinder to an open nonthreshing position; concave control means for releasably locking said concave in said closed position including, a catch member, pivot means mounting said catch member on said support for movement into and out of latching engagement with said concave, a toggle linkage having one end pivotally and slidably mounted on said support and having its other end mounted on a portion of said catch member in radially spaced relation to said pivot means, spring means operatively connected at one end thereof to said support and at the other end thereof to said toggle linkage for biasing the latter and associated catch into latching engagement with said concave, and flexible load transmitting means anchored at one of its ends to a portion of said concave in radially spaced relation to its associated pivot mounting and operatively connected at its other end to said other end of said spring means for resiliently limiting downward swinging movement of said concave.

4. A concave mounting for a threshing mechanism of the type having a rotatably mounted threshing cylinder comprising: a support; a concave pivotally mounted on said support for downward swinging movement from a closed position in threshing relation to said cylinder to an open nonthreshing position; concave control means for releasably locking said concave in said closed position including, a bell crank, first pivot means mounting said bell crank on said support, one arm of said bell crank having a catch member movable therewith into and out of latching engagement with said concave, a toggle link, second pivot means mounting one end of said toggle link on the other arm of said bell crank, and a third means pivotally and slidably mounting the other end of said toggle link, a compression spring operatively interposed between said toggle link and said third pivot means to resiliently urge said bell crank catch member in one direction into latching engagement with said concave, said toggle link and pivot centers affording unlatching movement of said bell crank catch member in the other direction under an overload applied to said concave wherein said second pivot means will move from a spring compressed position on one side of a line through said first and third pivot means to a spring unloaded position on the other side thereof, and flexible load transmitting means anchored at one of its ends to said concave and operatively connected at its other end to said other arm of said bell crank, and operative under tension to move said bell crank and associated second pivot means toward said spring compressed position to thereby resiliently limit downward swinging movement of said concave.

References Cited in the file of this patent

UNITED STATES PATENTS

| | | |
|---|---|---|
| 816,823 | Robby | Apr. 3, 1906 |
| 2,528,232 | Krause | Oct. 31, 1950 |